(12) United States Patent
Chen et al.

(10) Patent No.: US 11,088,639 B2
(45) Date of Patent: Aug. 10, 2021

(54) MOTOR DRIVING DEVICE AND METHOD THEREOF

(71) Applicant: ANPEC ELECTRONICS CORPORATION, Hsinchu (TW)

(72) Inventors: Kun-Min Chen, Hsinchu (TW); Ching-Shan Lu, Hsinchu (TW); Shih-Hai Chien, Hsinchu (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 0 days.

(21) Appl. No.: 16/720,504

(22) Filed: Dec. 19, 2019

(65) Prior Publication Data

US 2021/0075346 A1 Mar. 11, 2021

(30) Foreign Application Priority Data

Sep. 11, 2019 (TW) ................. 108132855

(51) Int. Cl.
*H02P 23/12* (2006.01)
*H02P 6/15* (2016.01)

(52) U.S. Cl.
CPC .................. *H02P 6/153* (2016.02)

(58) Field of Classification Search
CPC ...... H02P 6/15; H02P 6/16; H02P 1/28; H02P 6/153
See application file for complete search history.

(56) References Cited

U.S. PATENT DOCUMENTS

2015/0274099 A1* 10/2015 Boucly ................. H02M 3/156
307/10.1

* cited by examiner

*Primary Examiner* — Karen Masih
(74) *Attorney, Agent, or Firm* — Li & Cai Intellectual Property (USA) Office

(57) ABSTRACT

A motor driving device includes a first hysteresis comparator, a second hysteresis comparator, a logic circuit, a control unit, and an inverter circuit. The logic circuit receives a start signal or a start completion signal to output the first output signal as a commutation signal according to the start signal, or to output the second output signal as the commutation signal according to the start completion signal, clamps the second output signal by the first output signal, stops outputting the commutation signal after the potential state of the commutation signal is changed, and unclamps the second output signal with the first output signal and outputs the commutation signal in response to a difference voltage between the first input signal and the second input signal being greater than a positive value of the first hysteresis voltage or less than a negative value of the first hysteresis voltage.

20 Claims, 7 Drawing Sheets

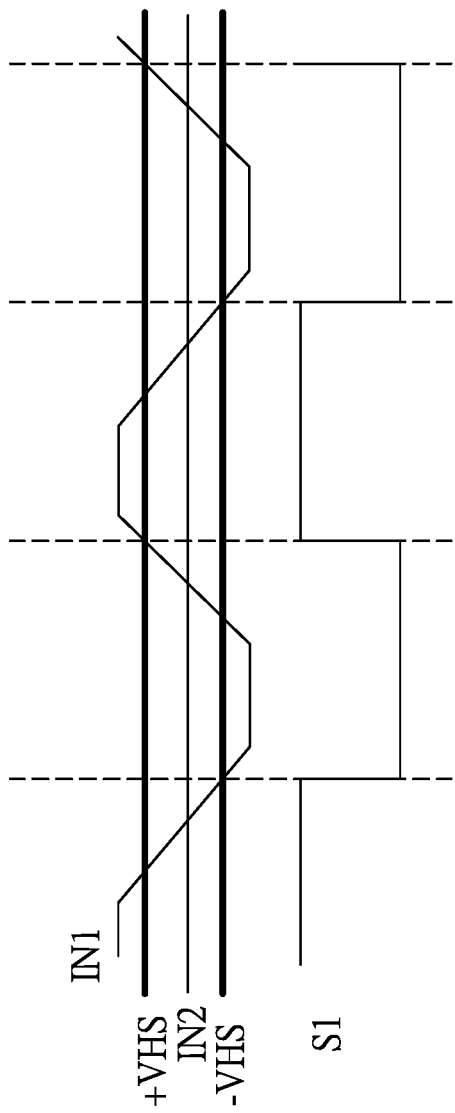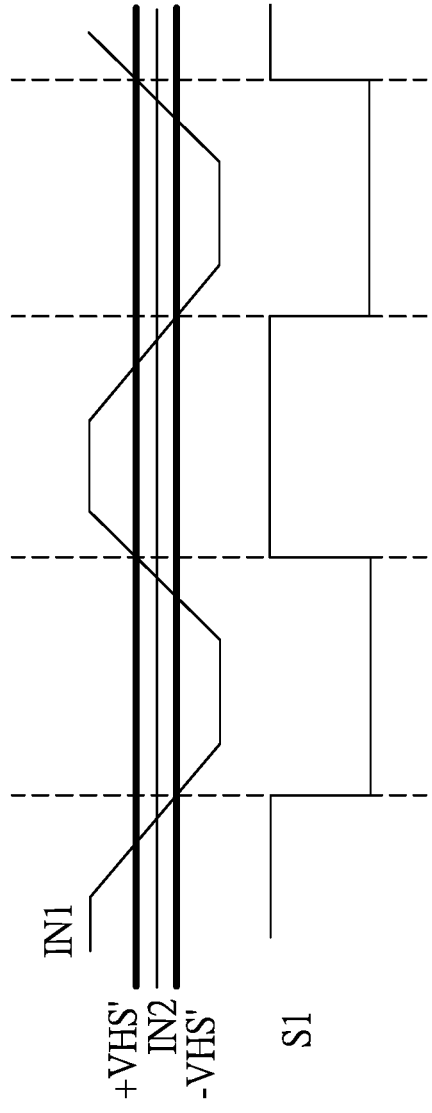

MOTOR DRIVING DEVICE AND METHOD THEREOF

CROSS-REFERENCE TO RELATED PATENT APPLICATION

This application claims the benefit of priority to Taiwan Patent Application No. 108132855, filed on Sep. 11, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a motor driving device and method, and more particularly to a motor driving device and method for resisting noises and suitable for weak magnetic or weak back electromotive force.

BACKGROUND OF THE DISCLOSURE

Direct current (DC) brushless motors are common motors that have advantages of high efficiency, lightness, thinness, shortness, and smallness, and thus are widely used in various fields. In existing electronic products, such as personal computers, notebook computers, communication devices, and household appliances, DC brushless motors are widely used. For example, fan motors for various electronic products and spindle motors for computer storage devices utilize the DC brushless motors. In general, when driving a DC brushless motor, a position of a rotor of the motor must be detected to properly drive commutation switches for performing a commutation procedure.

The existing brushless DC motor system typically includes a three-phase brushless DC motor, a Hall sensor, and a driver. However, since the Hall sensor is prone to misjudge time points of commutation under weak magnetic force, or since a hysteresis voltage of a hysteresis comparator used for detection during operation is as the same as a hysteresis voltage used in a starting mode, thereby causing the commutation falls behind.

Furthermore, since the Hall sensor is easily affected by external environments, a sensing accuracy may be lowered, and may even malfunction in some environments (for example, an environment with an excessive temperature). On the other hand, the brushless DC motor system further includes the Hall sensor, and a volume of the system and manufacturing costs are therefore increased. Therefore, a sensorless driving method without using a sensor is further proposed.

In the existing sensorless driving method, since it is common to misjudge time points of commutation under weak back electromitive force, or since the hysteresis voltage of the hysteresis comparator used for detection during operation is the same as a hysteresis voltage used in a starting mode, the commutation falls behind.

Therefore, there is an urgent need for a motor driving device and method capable of performing commutation detection using different hysteresis voltages in a start state and an operating state according to an operating condition of a motor.

SUMMARY OF THE DISCLOSURE

In response to the above-referenced technical inadequacies, the present disclosure provides a motor driving device and method capable of performing commutation detection using different hysteresis voltages in a start state and an operating state according to an operating condition of a motor.

In one aspect, the present disclosure provides a motor driving device for driving a motor, and the motor driving device includes a first hysteresis comparator, a second hysteresis comparator, a logic circuit, a control unit, and an inverter circuit. The first hysteresis comparator has a first hysteresis voltage and is configured to compare a first input signal with a second input signal, and correspondingly output a first output signal according to a comparison result. The second hysteresis comparator has a second hysteresis voltage and is configured to compare the first input signal with the second input signal, and correspondingly output a second output signal according to a comparison result. The logic circuit is configured to: receive a start signal or a start completion signal to output the first output signal as a commutation signal according to the start signal, or to output the second output signal as the commutation signal according to the start completion signal; clamp the second output signal by the first output signal; stop outputting the commutation signal after the potential state of the commutation signal is changed; and release a clamping on the second output signal by the first output signal and output the commutation signal in response to a difference voltage between the first input signal and the second input signal being greater than a positive value of the first hysteresis voltage or less than a negative value of the first hysteresis voltage. The control unit is configured to generate a driving signal according to the commutation signal, and determine whether the motor is started according to a driving condition of the motor to determine whether to output the start signal or the start completion signal. The inverter circuit is configured to control a plurality of phase circuits of the motor according to the drive signal to drive the motor. The first hysteresis voltage is greater than the second hysteresis voltage.

In certain embodiments, the motor driving device further includes a motor parameter detecting module configured to detect a plurality of operating parameters of the motor and correspondingly output a plurality of parameter signals, wherein the control unit is configured to determine the operating condition of the motor according to the driving condition of the motor to determine whether to output the start signal or the start completion signal.

In certain embodiments, the logic circuit is configured to control the first hysteresis comparator to raise the first hysteresis voltage when receiving the starting completion signal.

In certain embodiments, the second hysteresis voltage approaches zero.

In certain embodiments, the motor driving device further includes a Hall sensor configured to detect a rotor position of the motor and generate a Hall signal group including the first input signal and the second input signal.

In certain embodiments, the motor driving device further includes a floating phase circuit configured to select a floating phase of the motor that is not turned on, and output a floating phase signal as the first input signal, wherein the second input signal is provided from a reference voltage source.

In one aspect, the present disclosure provides a motor driving device for driving a motor, and the motor driving device includes a hysteresis comparator, a logic circuit, a control unit, and an inverter circuit. The hysteresis comparator has a hysteresis voltage and is configured to compare a first input signal with a second input signal, and correspondingly output a first output signal according to a comparison result. The logic circuit is configured to: receive a start signal or a start completion signal to output the first output signal as a commutation signal according to the start signal, or to control the hysteresis comparator to reduce the hysteresis voltage and output the first output signal as the commutation signal according to the start completion signal. The control unit is configured to generate a driving signal according to the commutation signal, and determine whether the motor is started according to a driving condition of the motor to determine whether to output the start signal or the start completion signal. The inverter circuit is configured to control a plurality of phase circuits of the motor according to the drive signal to drive the motor.

In certain embodiments, the motor driving device further includes a motor parameter detecting module configured to detect a plurality of operating parameters of the motor and correspondingly output a plurality of parameter signals, wherein the control unit is configured to determine the operating condition of the motor according to the driving condition of the motor to determine whether to output the start signal or the start completion signal.

In certain embodiments, the motor driving device further includes a Hall sensor configured to detect a rotor position of the motor and generate a Hall signal group including the first input signal and the second input signal.

In certain embodiments, the motor driving device further includes a floating phase circuit configured to select a floating phase of the motor that is not turned on, and output a floating phase signal as the first input signal, wherein the second input signal is provided from a reference voltage source.

In one aspect, the present disclosure provides a motor driving method for driving a motor, the motor driving method includes the following steps: configuring a first hysteresis comparator having a first hysteresis voltage to compare a first input signal with a second input signal, and correspondingly output a first output signal according to a comparison result; configuring a second hysteresis comparator having a second hysteresis voltage to compare the first input signal with the second input signal, and correspondingly output a second output signal according to a comparison result; configuring a logic circuit to: receive a start signal or a start completion signal to output the first output signal as a commutation signal according to the start signal, or to output the second output signal as the commutation signal according to the start completion signal; clamp the second output signal by the first output signal; stop outputting the commutation signal after the potential state of the commutation signal is changed; and release a clamping on the second output signal by the first output signal and output the commutation signal in response to a difference voltage between the first input signal and the second input signal being greater than a positive value of the first hysteresis voltage or less than a negative value of the first hysteresis voltage; configuring a control unit to generate a driving signal according to the commutation signal, and determine whether the motor is started according to a driving condition of the motor to determine whether to output the start signal or the start completion signal; and configuring an inverter circuit to control a plurality of phase circuits of the motor according to the drive signal to drive the motor. The first hysteresis voltage is greater than the second hysteresis voltage.

In certain embodiments, the motor driving method further includes: configuring a motor parameter detecting module to detect a plurality of operating parameters of the motor and correspondingly output a plurality of parameter signals; and configuring the control unit to determine the operating condition of the motor according to the driving condition of the motor to determine whether to output the start signal or the start completion signal.

In certain embodiments, the motor driving method further includes: configuring the logic circuit to control the first hysteresis comparator to raise the first hysteresis voltage when receiving the starting completion signal.

In certain embodiments, the second hysteresis voltage approaches zero.

In certain embodiments, the motor driving method further includes configuring a Hall sensor to detect a rotor position of the motor and generate a Hall signal group including the first input signal and the second input signal.

In certain embodiments, the motor driving method further includes: configuring a floating phase circuit to select a floating phase of the motor that is not turned on, and output a floating phase signal as the first input signal; and configuring a reference voltage source to output the second input signal.

In one aspect, the present disclosure provides a motor driving method for driving a motor, and the motor driving method includes the following steps: configuring a hysteresis comparator having a hysteresis voltage to compare a first input signal with a second input signal, and correspondingly output a first output signal according to a comparison result; configuring a logic circuit to: receive a start signal or a start completion signal to output the first output signal as a commutation signal according to the start signal, or to control the hysteresis comparator to reduce the hysteresis voltage and output the first output signal as the commutation signal according to the start completion signal; configuring a control unit to generate a driving signal according to the commutation signal, and determine whether the motor is started according to a driving condition of the motor to determine whether to output the start signal or the start completion signal; and configuring an inverter circuit to control a plurality of phase circuits of the motor according to the drive signal to drive the motor.

In some embodiments, the motor driving method further includes: configuring a motor parameter detecting module to detect a plurality of operating parameters of the motor, and correspondingly outputting a plurality of parameter signals; and configuring the control unit to determine the operating parameter according to the operating parameters The operating condition of the motor to determine whether to output the start signal or the start completion signal.

In certain embodiments, the motor driving method further includes configuring a Hall sensor to detect a rotor position of the motor and generate a Hall signal group including the first input signal and the second input signal.

In certain embodiments, the motor driving method further includes: configuring a floating phase circuit to select a floating phase of the motor that is not turned on, and output a floating phase signal as the first input signal, wherein the second input signal is provided from a reference voltage source.

Therefore, the motor driving device and method provided by the present disclosure can utilize different hysteresis voltages respectively in a start state and an operating state according to an operating condition of the motor, thereby preventing the Hall sensor from misjudging the time points of commutation under weak magnetic force. Further, the commutation point can be prevented from falling behind in the operating state by using a hysteresis voltage different from that in the starting state.

In addition, the motor driving device and method provided by the present disclosure can resist noise in the start state and improve an efficiency of the motor in an operating state, while not causing differences being too large in efficiency among samples fabricated in mass production due to weak magnetic force of a magnetic strip or weak back electromotive force.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

FIGS. 5A and 5B are timing charts of signals of a start state and a start completion state of the motor drive circuit according to the second embodiment of the present disclosure.

DETAILED DESCRIPTION OF THE EXEMPLARY EMBODIMENTS

Figure 1:
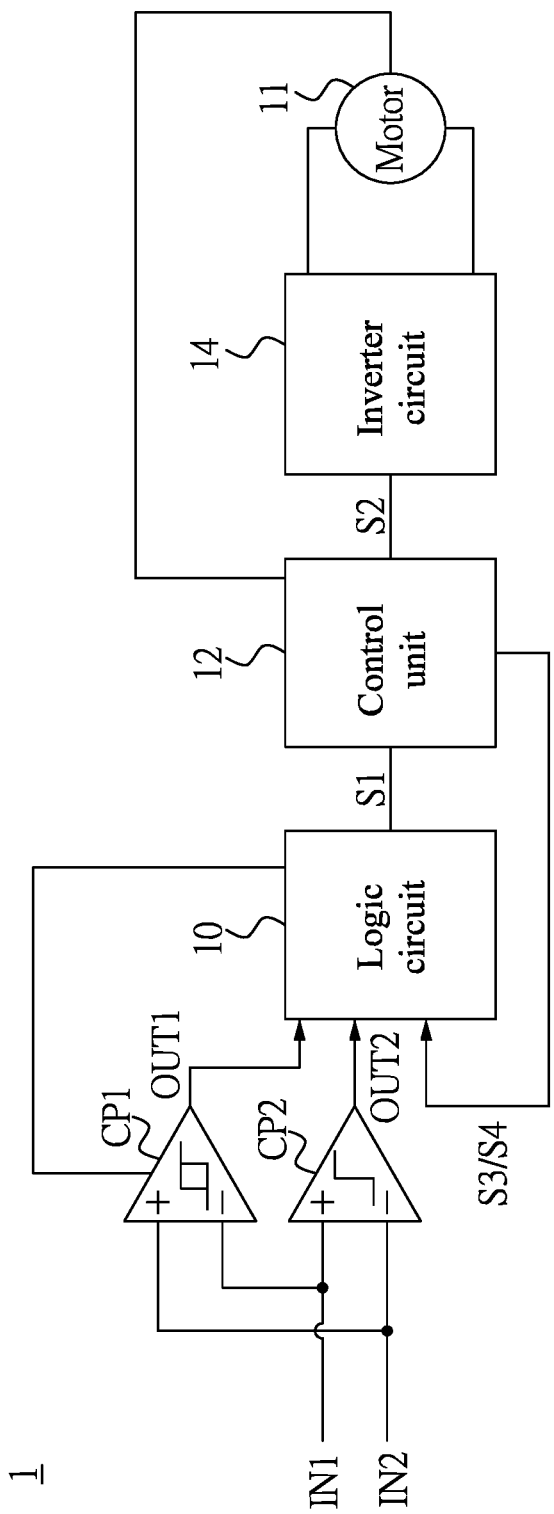
FIG. 1 is a circuit schematic diagram of a motor driving device according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Reference is made to FIG. 1, which is a circuit schematic diagram of a motor driving device according to a first embodiment of the present disclosure.

Referring to FIG. 1, a first embodiment of the present disclosure provides a motor driving device 1 for driving a motor 11, which includes a first hysteresis comparator CP1, a second hysteresis comparator CP2, a logic circuit 10, a control unit 12, and an inverter circuit 14.

The first hysteresis comparator CP1 has a first hysteresis voltage VHS1, and is configured to compare a first input signal IN1 with a second input signal IN2, and correspondingly output a first output signal according to a comparison result OUT1. Specifically, when a voltage difference between the first input signal IN1 and the second input signal IN2 is greater than a positive value of the first hysteresis voltage VHS1, the first output signal OUT1 has high potential. When the voltage difference between the first input signal IN1 and the second input signal IN2 is less than a negative value of the first hysteresis voltage VHS1, the first output signal OUT1 has low potential.

The second hysteresis comparator CP2 has a second hysteresis voltage VHS2 and is configured to compare the first input signal IN1 with the second input signal IN2, and correspondingly output a second output signal OUT2 according to a comparison result. In certain embodiments, the second hysteresis voltage approaches zero.

The logic circuit 10 is configured to receive a start signal S3 or a start completion signal S4, and operate in two modes. When the logic circuit 10 receives the start signal S3, the logic circuit 10 uses the first output signal OUT1 as a commutation signal S1 to be output. When the logic circuit 10 receives the start completion signal S4, the second output signal OUT2 is used as the commutation signal S1 to be output, and the logic circuit 10 clamps the second output signal OUT2 by the first output signal OUT1. The logic circuit 10 is configured to stop outputting the commutation signal S1 after a potential state of the commutation signal S1 is changed, release a clamping on the second output signal OUT2 by the first output signal OUT1 and output the commutation signal S1 in response to a difference voltage between the first input signal IN1 and the second input signal IN2 being greater than a positive value of the first hysteresis voltage VHS1 or less than a negative value of the first hysteresis voltage VHS1.

The control unit 12 is configured to generate the driving signal S2 according to the commutation signal S1, and determine whether a starting of the motor 11 is completed according to the driving condition of the motor to determine whether to output the start signal S3 or the start completion signal S4.

The inverter circuit 14 is configured to control a plurality of phase circuits of the motor 11 in accordance with the driving signal S2 to drive the motor 11. The first hysteresis voltage VHS1 is greater than the second hysteresis voltage VH2.

Figure 2A:
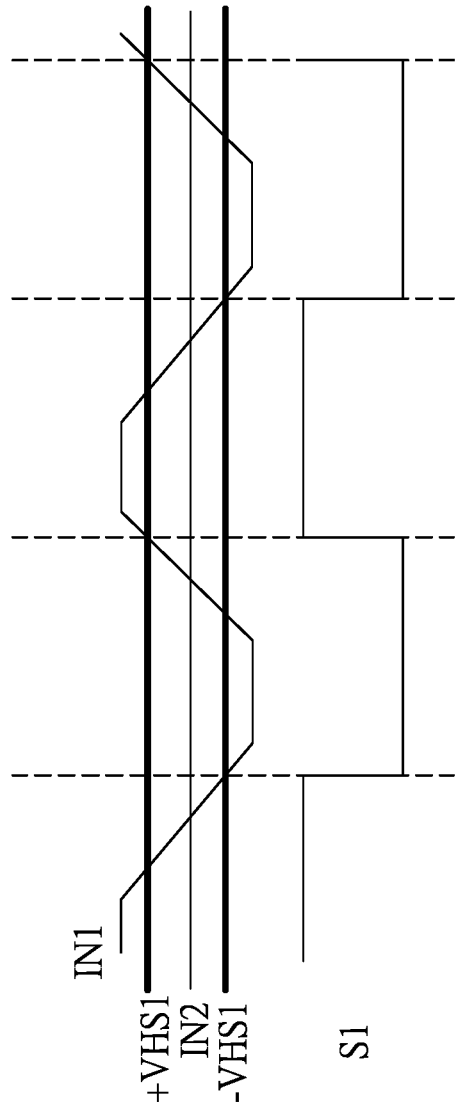
FIGS. 2A and 2B are timing charts of signals of a start state and a start completion state of the motor drive circuit according to the first embodiment of the present disclosure.
Figure 2B:
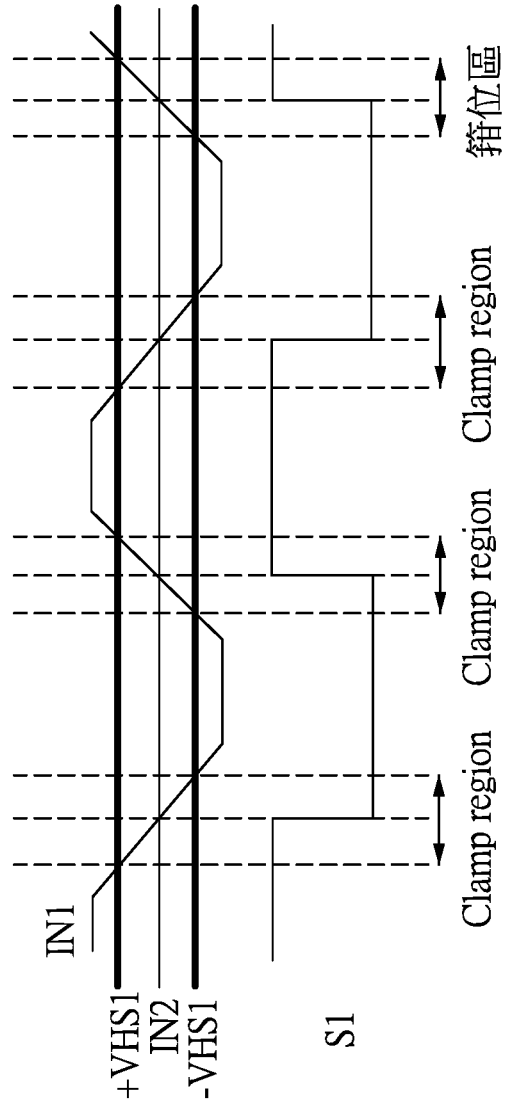

Reference is further made to FIGS. 2A and 2B, FIGS. 2A and 2B are timing charts of signals of a start state and a start completion state of the motor drive circuit according to the first embodiment of the present disclosure. As shown in FIG. 2A, the first output signal OUT1 is used as the commutation signal S1 and output in the start state. In the start state, when the difference voltage between the first input signal IN1 and the second input signal IN2 is greater than the positive value of the first hysteresis voltage VHS1, the commutation signal S1 is converted from the low potential to the high potential. When the difference voltage between the first input signal IN1 and the second input signal IN2 is less than the negative value of the first hysteresis voltage VHS1, the commutation signal S1 is converted from the high potential to the low potential.

Further, when the logic circuit 10 receives the start completion signal S4, the logic circuit 10 uses the second output signal OUT2 as the commutation signal to be output, and clamps the second output signal OUT2 by the first output signal OUT1, which forms clamp regions as shown in FIG. 2B. The logic circuit 10 is configured to stop outputting the commutation signal S1 after a potential state of the commutation signal S1 is changed, release a clamping on the second output signal OUT2 by the first output signal OUT1 and output the second output signal OUT2 as the commutation signal S1 in response to a difference voltage between the first input signal IN1 and the second input signal IN2 being greater than the positive value of the first hysteresis voltage VHS1 or less than the negative value of the first hysteresis voltage VHS1. The second hysteresis voltage approaches 0, therefore, after the difference voltage between the first input signal IN1 and the second input signal IN2 is greater than the positive value of the first hysteresis voltage VHS1 or less than the negative value of the first hysteresis voltage VHS1, the commutation signal S1 can perform high-low potential conversion as a reference for the control unit 12 to generate the driving signal S2. In some embodiments, the logic circuit 10 controls the first hysteresis comparator CP1 to raise the first hysteresis voltage VHS1 in response to receiving the start completion signal S4.

Figure 3:
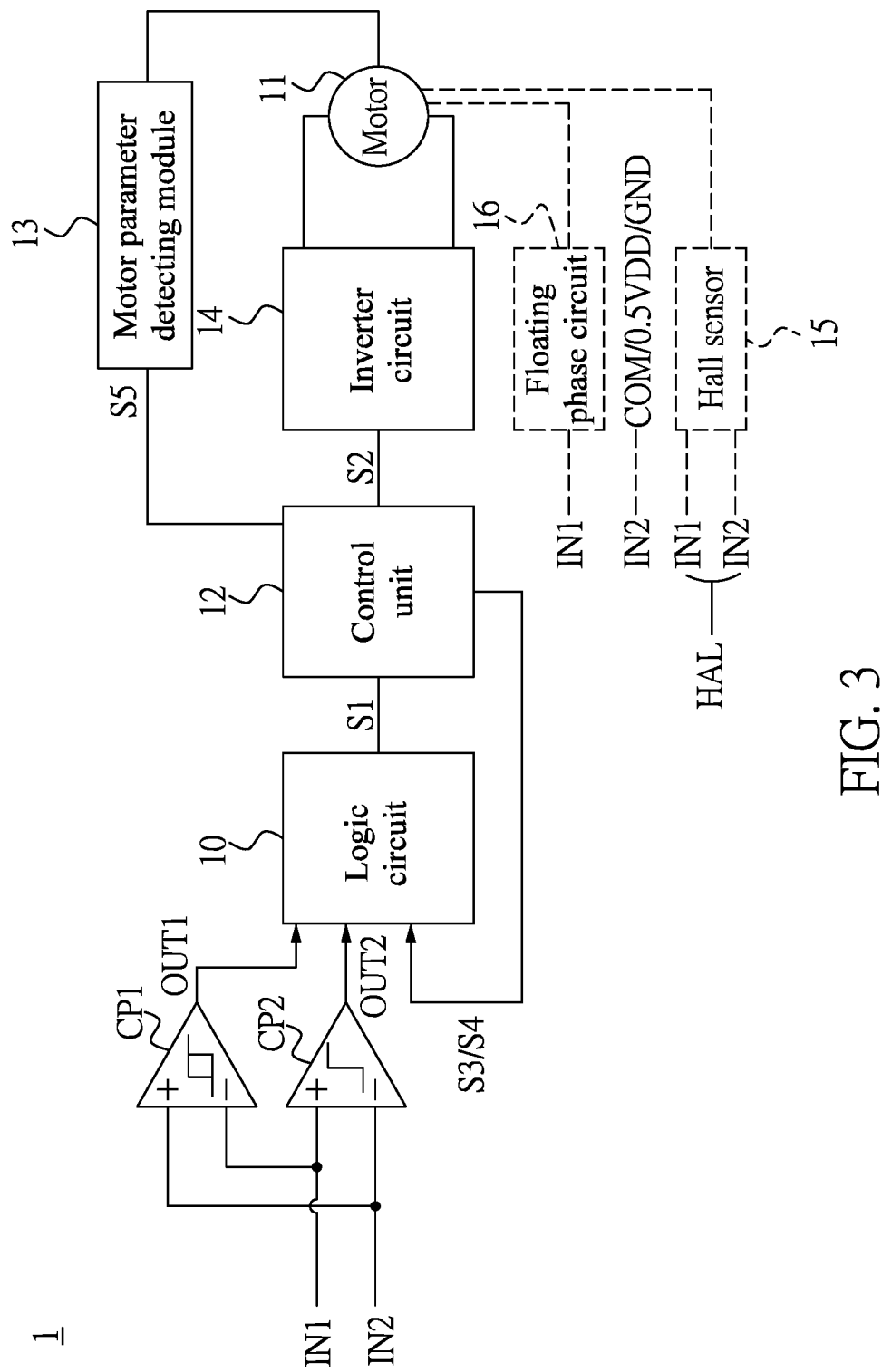
FIG. 3 is another circuit schematic diagram of a motor driving device according to the first embodiment of the present disclosure.

Reference is made to FIG. 3, which is another circuit schematic diagram of a motor driving device according to the first embodiment of the present disclosure.

As shown in FIG. 3, the motor driving device 1 further includes a motor parameter detecting module 13 configured to detect a plurality of operating parameters of the motor 11 and correspondingly output a plurality of parameter signals S5. The control unit 12 is configured to determine the operating condition of the motor 11 according to the driving condition of the motor 11 to determine whether to output the start signal S3 or the start completion signal S4. For example, the motor parameter detecting module 13 can be a rotation speed detector. When the control unit 12 determines that the rotation speed of the motor 11 exceeds a predetermined rotation speed, it is determined that the starting of the motor 11 is complete, and the control unit 12 outputs the start completion signal S4. The start signal S3 and the start completion signal S4 can be represented by high and low potentials in the same signal, and the present disclosure is not limited thereto.

Optionally, when the motor 11 is a single-phase/two-phase/three-phase brushless DC motor, the motor driving device 1 may include a Hall sensor 15 configured to detect a rotor position of the motor 11 and generate a Hall signal group HAL including the first input signal IN1 and the second input signal IN2. The inverter circuit 14 can include a plurality of upper and lower bridge switch groups, the number of which corresponds to the number of phase circuits of the motor 11.

Optionally, when the motor 11 is a sensorless motor, the motor driving device 1 can further include a floating phase circuit 16 configured to select a floating phase of the motor 11 that is not turned on, and output a floating phase signal as the first input signal IN1. The second input signal IN2 is provided from a reference voltage source, for example, a common voltage source COM, 0.5 times of an inter-chip voltage VDD, or the ground GND.

Therefore, the motor driving device 1 can utilize different hysteresis voltages respectively in the start state and the operating state according to an operating condition of the motor, thereby preventing the Hall sensor from misjudging the time points of commutation under weak magnetic force. Further, commutation points can be prevented from falling behind in the operating state by using a hysteresis voltage different from that in the starting state. In addition, the motor driving device 1 can resist noise in the start state and improve an efficiency of the motor in an operating state, while not causing differences being too large in efficiency among samples fabricated in mass production due to weak magnetic force of a magnetic strip or weak back electromotive force.

Figure 4:
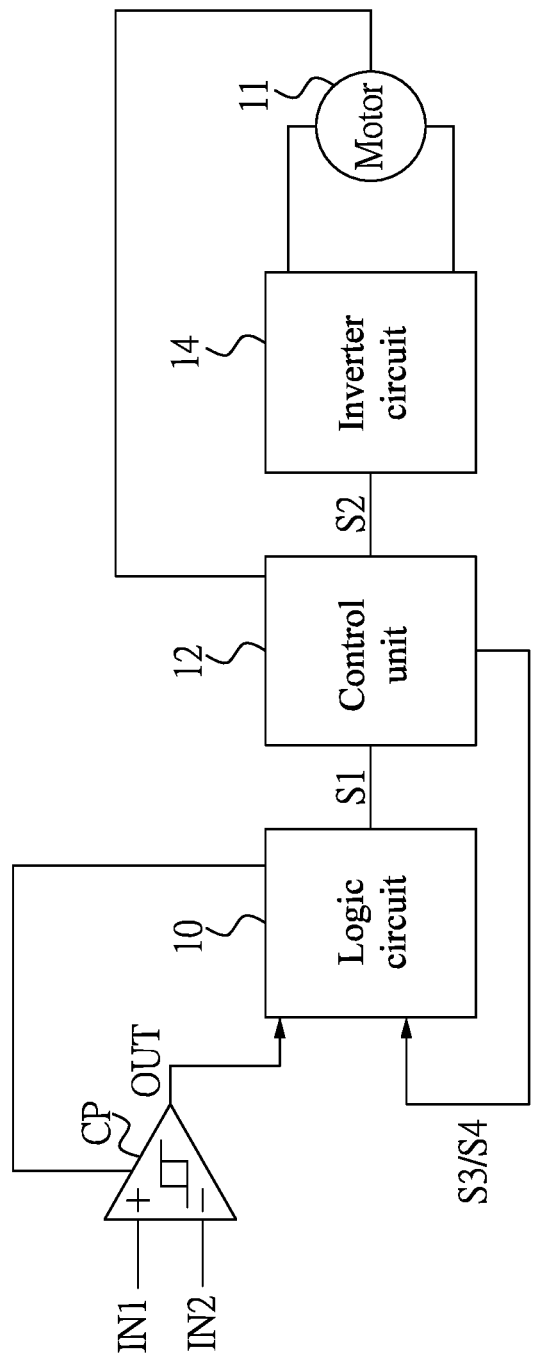
FIG. 4 is a circuit schematic diagram of a motor driving device according to a second embodiment of the present disclosure.

Reference is made to FIG. 4, which is a circuit schematic diagram of a motor driving device according to a second embodiment of the present disclosure.

Referring to FIG. 4, a second embodiment of the present disclosure provides a motor driving device 1 for driving a motor 11, which includes a hysteresis comparator CP, a logic circuit 10, a control unit 12, and an inverter circuit 14.

The hysteresis comparator CP has a hysteresis voltage VHS, and is configured to compare a first input signal IN1 with a second input signal IN2, and correspondingly output an output signal OUT according to a comparison result.

The logic circuit 10 is configured to receive a start signal S3 or a start completion signal S4 to output the output signal OUT as a commutation signal S1 according to the start signal S3, or to control the hysteresis comparator CP to reduce the hysteresis voltage VHS and output the output signal OUT as the commutation signal S1 according to the start completion signal S4.

The operational details of the control unit 12 and the inverter circuit 14 are the same as those of the first embodiment, and the repeated descriptions are omitted hereinafter.

Reference is further made to FIGS. 5A and 5B, FIGS. 5A and 5B are timing charts of signals of a start state and a start completion state of the motor drive circuit according to the second embodiment of the present disclosure. As shown in FIG. 5A, which shows that the output signal OUT is used as the commutation signal S1 and output in the start state. In the start state, when the difference voltage between the first input signal IN1 and the second input signal IN2 is greater than the positive value of the hysteresis voltage VHS1, the commutation signal S1 is converted from the low potential to the high potential. When the difference voltage between the first input signal IN1 and the second input signal IN2 is less than the negative value of the hysteresis voltage VHS, the commutation signal S1 is converted from the high potential to the low potential.

In the operating state, the hysteresis voltage VHS is reduced to the hysteresis voltage VHS'. When the difference voltage between the first input signal IN1 and the second input signal IN2 is greater than the positive value of the hysteresis voltage VHS1, the commutation signal S1 is converted from the low potential to the high potential. When the difference voltage between the first input signal IN1 and the second input signal IN2 is less than the negative value of the hysteresis voltage VHS, the commutation signal S1 is converted from the high potential to the low potential. In other words, by reducing the hysteresis voltage VHS after the start of the motor 11 is completed, it is possible to prevent the commutation point from falling behind due to weak magnetic force of the magnetic strip or weak back electromotive force.

Similarly, the motor parameter detection module, the Hall sensor, and the floating phase circuit can also be configured according to the type of the motor. Details thereof have been described in the first embodiment, and thus are not described hereinafter.

Figure 6:
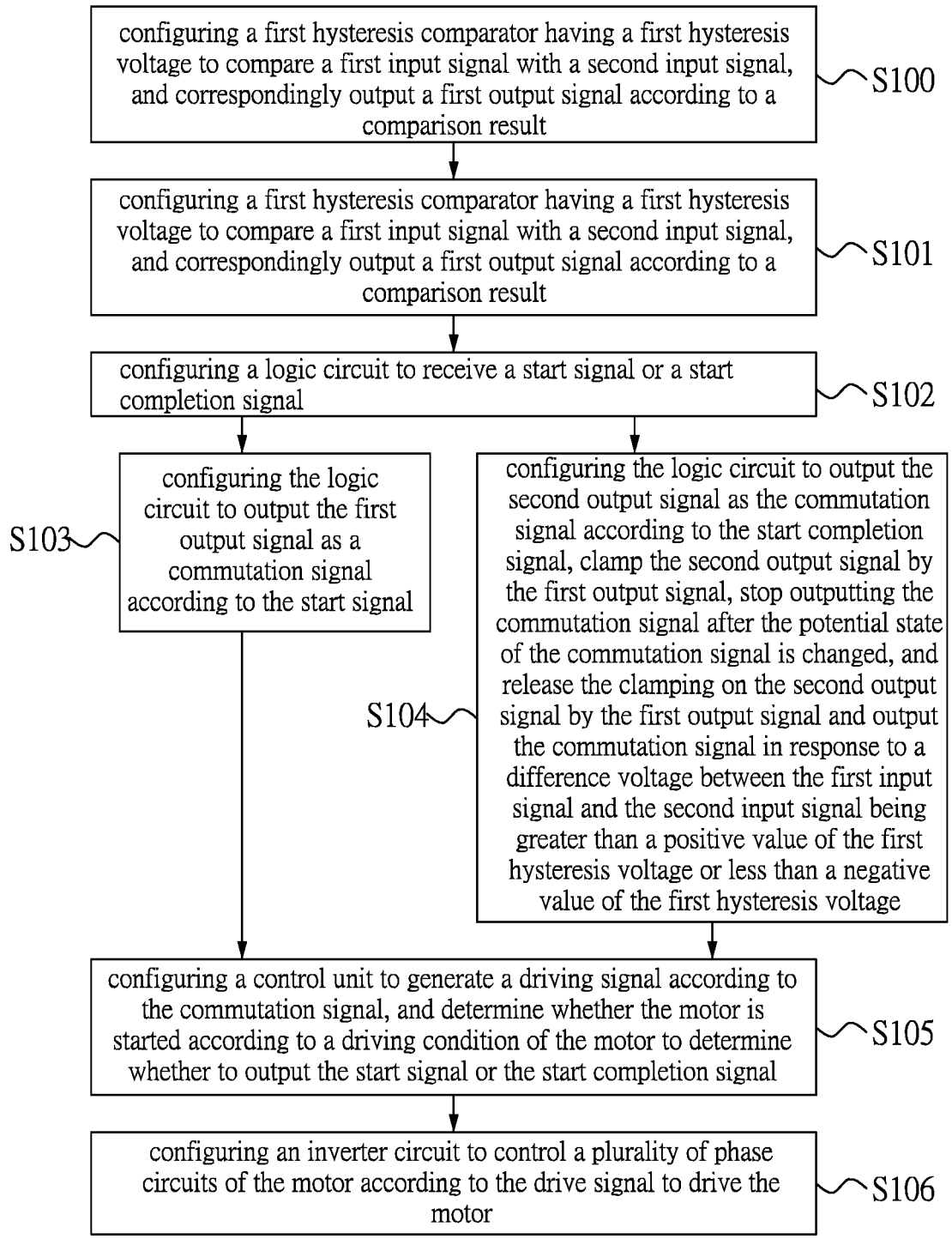
FIG. 6 is a flow chart showing a motor driving method according to a third embodiment of the present disclosure.

Reference is made to FIG. 6, which is a flow chart showing a motor driving method according to a third embodiment of the present disclosure. As shown in FIG. 6, a third embodiment of the present disclosure provides a motor driving method applicable to the motor driving device of the first embodiment described above, but is not limited thereto, and the repeated descriptions of the operational details of the components of the motor driving device will be omitted for convenience of explanation. The motor driving method includes the following steps:

Step S100: configuring a first hysteresis comparator having a first hysteresis voltage to compare a first input signal with a second input signal, and correspondingly output a first output signal according to a comparison result.

Step S101: configuring a first hysteresis comparator having a first hysteresis voltage to compare a first input signal with a second input signal, and correspondingly output a first output signal according to a comparison result.

Step S102: configuring a logic circuit to receive a start signal or a start completion signal.

If the logic circuit receives the start signal, the method proceeds to step S103: configuring the logic circuit to output the first output signal as a commutation signal according to the start signal.

If the logic circuit receives the start completion signal, the method proceeds to step S104: configuring the logic circuit to output the second output signal as the commutation signal according to the start completion signal, clamp the second output signal by the first output signal, stop outputting the commutation signal after the potential state of the commutation signal is changed, and release the clamping on the second output signal by the first output signal and output the commutation signal in response to a difference voltage between the first input signal and the second input signal being greater than a positive value of the first hysteresis voltage or less than a negative value of the first hysteresis voltage.

Step S105: configuring a control unit to generate a driving signal according to the commutation signal, and determine whether the motor is started according to a driving condition of the motor to determine whether to output the start signal or the start completion signal.

Step S106: configuring an inverter circuit to control a plurality of phase circuits of the motor according to the drive signal to drive the motor. The first hysteresis voltage is greater than the second hysteresis voltage.

Figure 7:
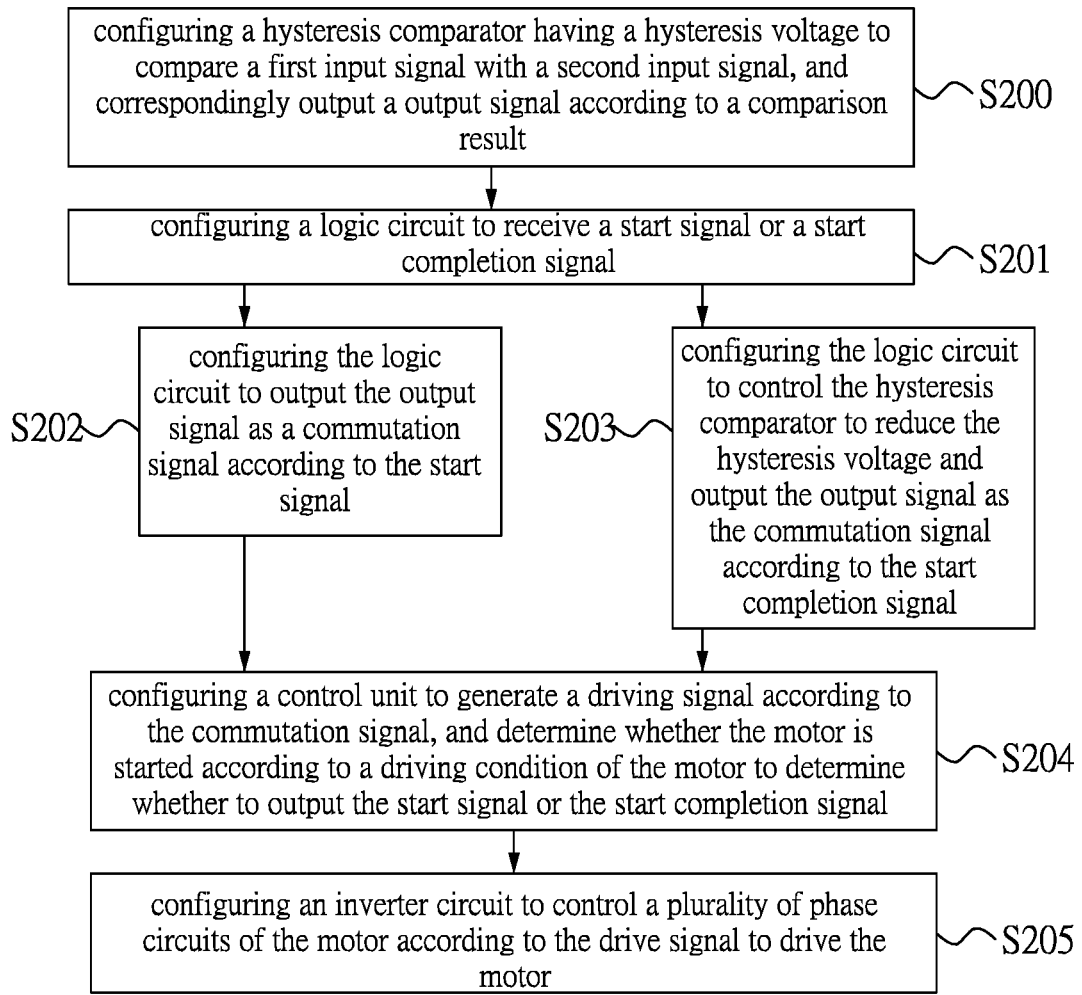
FIG. 7 is a flow chart showing a motor driving method according to a fourth embodiment of the present disclosure.

Reference is made to FIG. 7, which is a flow chart showing a motor driving method according to a fourth embodiment of the present disclosure. As shown in FIG. 7, a fourth embodiment of the present disclosure provides a motor driving method applicable to the motor driving device of the first embodiment described above, but is not limited thereto, and the repeated descriptions of the operational details of the components of the motor driving device will be omitted for convenience of explanation. The motor driving method includes the following steps:

Step S200: configuring a hysteresis comparator having a hysteresis voltage to compare a first input signal with a second input signal, and correspondingly output an output signal according to a comparison result.

Step S201: configuring a logic circuit to receive a start signal or a start completion signal.

If the logic circuit receives the start signal, the method proceeds to step S202: configuring the logic circuit to output the output signal as a commutation signal according to the start signal.

If the logic circuit receives the start completion signal, the method proceeds to step S203: configuring the logic circuit to control the hysteresis comparator to reduce the hysteresis voltage and output the output signal as the commutation signal according to the start completion signal.

Step S204: configuring a control unit to generate a driving signal according to the commutation signal, and determine whether the motor is started according to a driving condition of the motor to determine whether to output the start signal or the start completion signal.

Step S205: configuring an inverter circuit to control a plurality of phase circuits of the motor according to the drive signal to drive the motor.

In conclusion, the motor driving device and method provided by the present disclosure can utilize different hysteresis voltages respectively in a start state and an operating state according to an operating condition of the motor, thereby preventing the Hall sensor from misjudging the time points of commutation under weak magnetic force. Further, the commutation point can be prevented from falling behind in the operating state by using a hysteresis voltage different from that in the starting state.

In addition, the motor driving device and method provided by the present disclosure can resist noise in the start state and improve an efficiency of the motor in an operating state, while not causing differences being too large in efficiency among samples fabricated in mass production due to weak magnetic force of a magnetic strip or weak back electromotive force.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:
1. A motor driving device for driving a motor, comprising:
   a first hysteresis comparator having a first hysteresis voltage, configured to compare a first input signal with a second input signal, and correspondingly output a first output signal according to a comparison result;

a second hysteresis comparator having a second hysteresis voltage, configured to compare the first input signal with the second input signal, and correspondingly output a second output signal according to a comparison result;
a logic circuit configured to:
  receive a start signal or a start completion signal to output the first output signal as a commutation signal according to the start signal, or to output the second output signal as the commutation signal according to the start completion signal;
  clamp the second output signal by the first output signal;
  stop outputting the commutation signal after a potential state of the commutation signal is changed; and
  release a clamping on the second output signal by the first output signal and output the commutation signal in response to a difference voltage between the first input signal and the second input signal being greater than a positive value of the first hysteresis voltage or less than a negative value of the first hysteresis voltage;
a control unit configured to generate a driving signal according to the commutation signal, and determine whether the motor is started according to a driving condition of the motor to determine whether to output the start signal or the start completion signal; and
an inverter circuit configured to control a plurality of phase circuits of the motor according to the drive signal to drive the motor,
wherein the first hysteresis voltage is greater than the second hysteresis voltage.

2. The motor driving device according to claim 1, further comprising a motor parameter detecting module configured to detect a plurality of operating parameters of the motor and correspondingly output a plurality of parameter signals, wherein the control unit is configured to determine the operating condition of the motor according to the driving condition of the motor to determine whether to output the start signal or the start completion signal.

3. The motor driving device according to claim 1, wherein the logic circuit is configured to control the first hysteresis comparator to raise the first hysteresis voltage when receiving the starting completion signal.

4. The motor driving device according to claim 1, wherein the second hysteresis voltage approaches zero.

5. The motor driving device according to claim 1, further comprising a Hall sensor configured to detect a rotor position of the motor and generate a Hall signal group including the first input signal and the second input signal.

6. The motor driving device according to claim 1, further comprising a floating phase circuit configured to select a floating phase of the motor that is not turned on, and output a floating phase signal as the first input signal, wherein the second input signal is provided from a reference voltage source.

7. A motor driving device for driving a motor, comprising:
a hysteresis comparator having a hysteresis voltage, configured to compare a first input signal with a second input signal, and correspondingly output a first output signal according to a comparison result;
a logic circuit configured to:
  receive a start signal or a start completion signal to output the first output signal as a commutation signal according to the start signal, or to control the hysteresis comparator to reduce the hysteresis voltage and output the first output signal as the commutation signal according to the start completion signal;
a control unit configured to generate a driving signal according to the commutation signal, and determine whether the motor is started according to a driving condition of the motor to determine whether to output the start signal or the start completion signal; and
an inverter circuit configured to control a plurality of phase circuits of the motor according to the drive signal to drive the motor.

8. The motor driving device according to claim 7, further comprising a motor parameter detecting module configured to detect a plurality of operating parameters of the motor and correspondingly output a plurality of parameter signals, wherein the control unit is configured to determine the operating condition of the motor according to the driving condition of the motor to determine whether to output the start signal or the start completion signal.

9. The motor driving device according to claim 7, further comprising a Hall sensor configured to detect a rotor position of the motor and generate a Hall signal group including the first input signal and the second input signal.

10. The motor driving device according to claim 7, further comprising a floating phase circuit configured to select a floating phase of the motor that is not turned on, and output a floating phase signal as the first input signal, wherein the second input signal is provided from a reference voltage source.

11. A motor driving method for driving a motor, the motor driving method comprising the following steps:
configuring a first hysteresis comparator having a first hysteresis voltage to compare a first input signal with a second input signal, and correspondingly output a first output signal according to a comparison result;
configuring a second hysteresis comparator having a second hysteresis voltage to compare the first input signal with the second input signal, and correspondingly output a second output signal according to a comparison result;
configuring a logic circuit to:
  receive a start signal or a start completion signal to output the first output signal as a commutation signal according to the start signal, or to output the second output signal as the commutation signal according to the start completion signal;
  clamp the second output signal by the first output signal;
  stop outputting the commutation signal after a potential state of the commutation signal is changed; and
  release a clamping on the second output signal by the first output signal and output the commutation signal in response to a difference voltage between the first input signal and the second input signal being greater than a positive value of the first hysteresis voltage or less than a negative value of the first hysteresis voltage;
configuring a control unit to generate a driving signal according to the commutation signal, and determine whether the motor is started according to a driving condition of the motor to determine whether to output the start signal or the start completion signal; and
configuring an inverter circuit to control a plurality of phase circuits of the motor according to the drive signal to drive the motor,
wherein the first hysteresis voltage is greater than the second hysteresis voltage.

12. The motor driving method according to claim 11, further comprising:

configuring a motor parameter detecting module to detect a plurality of operating parameters of the motor and correspondingly output a plurality of parameter signals; and configuring the control unit to determine the operating condition of the motor according to the driving condition of the motor to determine whether to output the start signal or the start completion signal.

13. The motor driving method according to claim 11, further comprising:

configuring the logic circuit to control the first hysteresis comparator to raise the first hysteresis voltage when receiving the starting completion signal.

14. The motor driving method according to claim 11, wherein the second hysteresis voltage approaches zero.

15. The motor driving method according to claim 11, further comprising:

configuring a Hall sensor to detect a rotor position of the motor and generate a Hall signal group including the first input signal and the second input signal.

16. The motor driving method according to claim 11, further comprising:

configuring a floating phase circuit to select a floating phase of the motor that is not turned on, and output a floating phase signal as the first input signal; and configuring a reference voltage source to output the second input signal.

17. A motor driving method for driving a motor, the motor driving method comprising the following steps:

configuring a hysteresis comparator having a hysteresis voltage to compare a first input signal with a second input signal, and correspondingly output a first output signal according to a comparison result;

configuring a logic circuit to: receive a start signal or a start completion signal to output the first output signal as a commutation signal according to the start signal, or to control the hysteresis comparator to reduce the hysteresis voltage and output the first output signal as the commutation signal according to the start completion signal;

configuring a control unit to generate a driving signal according to the commutation signal, and determine whether the motor is started according to a driving condition of the motor to determine whether to output the start signal or the start completion signal; and configuring an inverter circuit to control a plurality of phase circuits of the motor according to the drive signal to drive the motor.

18. The motor driving method according to claim 17, further comprising:

configuring a motor parameter detecting module to detect a plurality of operating parameters of the motor and correspondingly output a plurality of parameter signals; and configuring the control unit to determine the operating condition of the motor according to the driving condition of the motor to determine whether to output the start signal or the start completion signal.

19. The motor driving method according to claim 17, further comprising:

configuring a Hall sensor to detect a rotor position of the motor and generate a Hall signal group including the first input signal and the second input signal.

20. The motor driving method according to claim 17, further comprising:

configuring a floating phase circuit to select a floating phase of the motor that is not turned on, and output a floating phase signal as the first input signal, wherein the second input signal is provided from a reference voltage source.

\* \* \* \* \*